United States Patent
Ohno et al.

(10) Patent No.: US 8,121,750 B2
(45) Date of Patent: Feb. 21, 2012

(54) VEHICLE LOAD BACKUP CIRCUIT

(75) Inventors: Toru Ohno, Makinohara (JP); Masayuki Yamazaki, Wako (JP)

(73) Assignee: Yazaki Corporation, Tokyo (JP)

( * ) Notice: Subject to any disclaimer, the term of this patent is extended or adjusted under 35 U.S.C. 154(b) by 692 days.

(21) Appl. No.: 12/238,526

(22) Filed: Sep. 26, 2008

(65) Prior Publication Data

US 2009/0088920 A1    Apr. 2, 2009

(30) Foreign Application Priority Data

Sep. 28, 2007  (JP) .................................. 2007-254003

(51) Int. Cl.
*G06F 11/00*    (2006.01)
*G01R 31/36*    (2006.01)

(52) U.S. Cl. ............... 701/29; 701/33; 701/36; 324/771

(58) Field of Classification Search .................... 701/29, 701/33, 36; 307/80, 100; 324/771
See application file for complete search history.

(56) References Cited

U.S. PATENT DOCUMENTS

| | | | | |
|---|---|---|---|---|
| 5,074,626 | A * | 12/1991 | Kramer et al. | 303/122.04 |
| 5,897,596 | A * | 4/1999 | Kabune et al. | 701/29 |
| 6,243,629 | B1 * | 6/2001 | Sugimoto et al. | 701/29 |
| 6,990,404 | B2 * | 1/2006 | Takeuchi | 701/114 |
| 7,467,029 | B2 * | 12/2008 | Forest et al. | 701/1 |

FOREIGN PATENT DOCUMENTS

JP    61-150040 A    7/1986

* cited by examiner

*Primary Examiner* — Tan Q Nguyen (74) *Attorney, Agent, or Firm* — Sughrue Mion, PLLC (57) ABSTRACT

A load backup device includes an abnormality detection part which detects an abnormal operation of a processing part, and a backup driving part which drives a load based on an output from the abnormality detection part when the abnormality detection part detects the abnormal operation of the processing part.

11 Claims, 9 Drawing Sheets

VEHICLE LOAD BACKUP CIRCUIT

BACKGROUND

The present invention relates to a vehicle load backup circuit and more particularly to a vehicle load backup circuit for use in control of the drive of a vehicle load by a CPU in which the vehicle load is backup driven when an abnormal state of the CPU is detected.

In recent years, while there has been increasing the tendency that a multiplicity of functions and highly improved functions are imparted to on-board electrical equipment (electronic units), the demand for smaller and more inexpensive electronic units has been getting more stringent. In order to realize these contradicting demands (or the demand for electronic units having functions equal to or better than those of related electronic units and made smaller in size and lower in cost), it is inevitable that the control circuits for controlling the vehicle loads need to be made smaller in size and lower in cost.

The vehicle loads include lamp systems such as headlamps and motors for operating the side windows in the electric power window system. In particular, the automatic headlight on/off control, which will be, hereinafter, referred to simply as an automatic light control, is a control in which the headlamp output circuit is automatically switched on or off not through a switch operation by the driver but through the use of programmed software based on information (dark or bright) from the automatic light sensor. The automatic headlight backup circuit, which will be, hereinafter, referred to simply as an automatic light backup circuit, is a backup circuit for detecting a malfunction or abnormal operation of the CPU to switch on the headlamp output circuit so that the headlamp output circuit is not switched off even in the event that something abnormal is generated in the CPU (even in the event that the control through software becomes impossible) in such a state that the headlamps are illuminated by the automatic light control.

Figure 9:
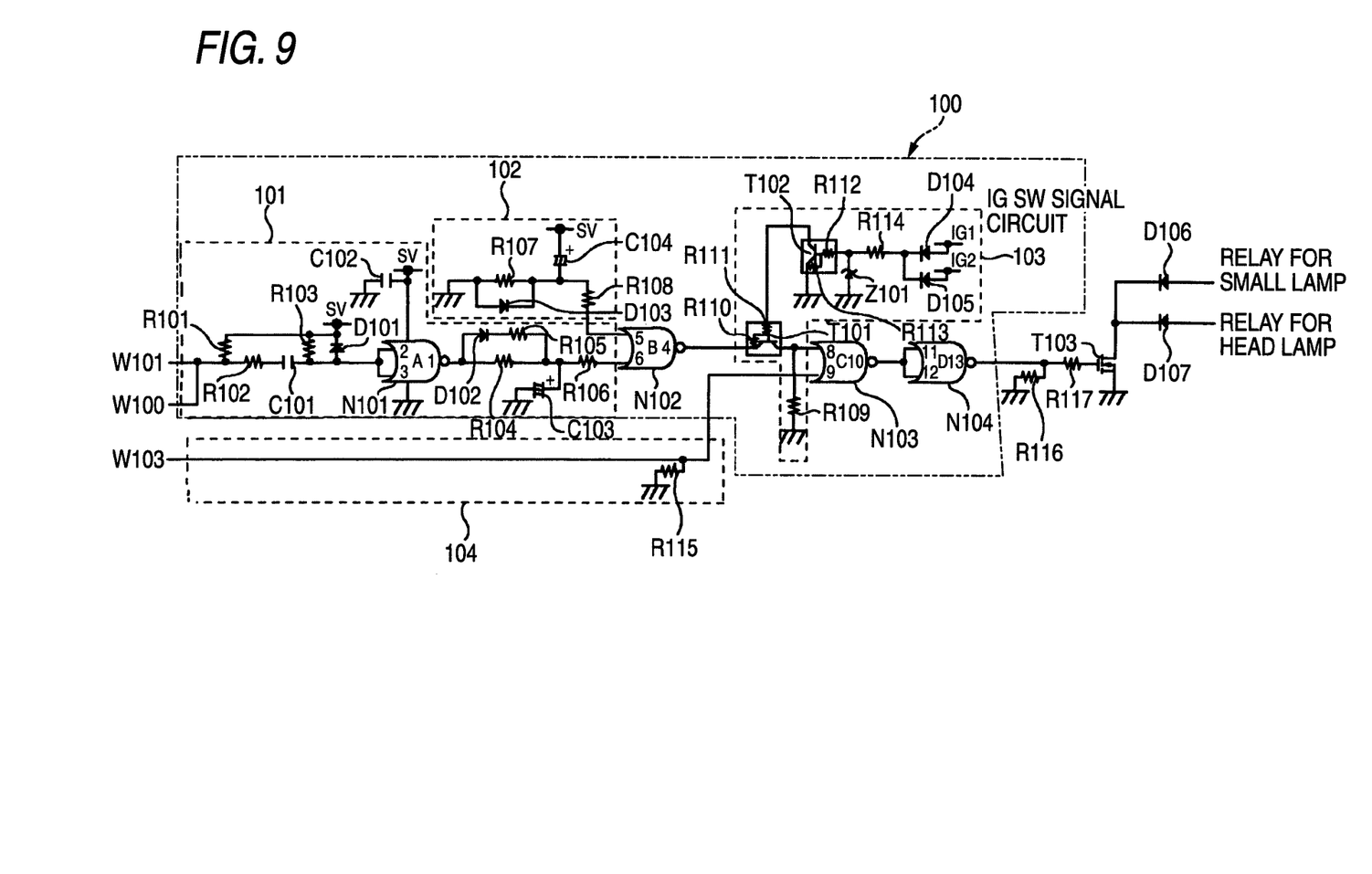
FIG. 9 is a circuit diagram showing a related automatic light backup circuit.

FIG. 9 is a circuit diagram showing a related automatic light backup circuit disclosed in Patent Document 1. In this automatic light backup circuit 100, a pulse output terminal W100 is connected to a pulse input terminal W101 of a regulator, and an output from a CPU abnormality detection circuit 101 which includes resistors R101 to R106, capacitors C101 to C103, diodes D101, D102 and a NOR gate N101 and an output from a 5V power supply rising delay circuit 102 which includes resistors R107, R108, a capacitor C104 and a diode D103 are made to be an input of a NOR gate N102. In addition, in an automatic light backup circuit 100, an output from the NOR gate 102 is inputted into an emitter of a transistor T101 of an ignition switch (IGSW) signal circuit 103 which includes resistors R109 to R114, diodes D104, D105, a Zener diode Z101 and transistors T101, T102, and an output from a collector of the transistor T101 is inputted into a NOR gate N103. Furthermore, in the automatic light backup circuit 100, an output from an automatic light determination signal circuit 104 which is connected to an output terminal W103 of a backup from the CPU to which a resistor R115 is connected is inputted into the NOR gate N103. In addition, in the automatic light backup circuit 100, an output from the NOR gate N103 is inputted into a NOR gate N104 and an output from the NOR gate N104 is inputted into a gate of the transistor T103 via resistors R116, R117 (the resistor R116 being a pull-down resistor of the output from the NOR gate N104), whereby by switching the transistor T103 on and off, a relay for driving sidelights or small lights and a relay for driving headlights which are connected to the transistor T103 via diodes D106, 107, respectively, are switched on and off. Normally, a 5V power supply is used as a power supply for the four NOR gates N101, N102, N103, N104. In FIG. 9, the illustration of 5V power supply terminals to the NOR gates N101, N102, N103, N104 is omitted.

In the related automatic light backup circuit 100 that is configured as described above, when pulse signals outputted from the output terminal W100 are stopped, an abnormal state of the CPU is detected. Here, the operation of the automatic light backup circuit 100 will briefly be described. When the CPU operates normally, pulse signals are inputted into the terminal W100 from the CPU at predetermined time intervals, whereby HIGH and LOW output voltages are outputted repeatedly from the NOR gate N101 at predetermined time intervals. Here, a potential of the capacitor C103 is made to be a higher potential than a certain threshold by quick charging by way of the resistor R105 and delayed discharging by way of the resistor R104, when the CPU operates normally. A low-level voltage is outputted from the 5V power supply rising delay circuit 102 after a period of time which is determined by a time constant of the circuit has elapsed since the power supply is risen. Here, a logic circuit is configured so that a backup is not activated when the power supply is risen (when a high-level voltage is outputted). A low-level voltage is outputted from the NOR gate N102 after a predetermined period of time has elapsed since the power supply is risen. In addition, when an ignition switch IG1 or IG2 is switched on by the ignition switch signal circuit 103, the transistor T1 operates, and an output from the NOR gate N102 is inputted into the NOR gate N103. As this occurs, when the level of output from the automatic light determination signal circuit 104 is low, the level of output from the NOR gate N103 becomes high, while the level of output from the NR gate N104 becomes low, whereby the transistor T103 becomes inoperable. Therefore, the small lights relay and the headlights relay become inoperable, and hence, the small lights and the headlights are kept non-illuminated. On the other hand, when the level of output from the automatic light determination signal circuit 104 is high, the level of output from the NOR gate N103 becomes low, while the level of output from the NOR gate N104 becomes high, whereby the transistor T103 is put in an ON state, and the small lights relay and the headlights relay are put in operation, whereby the small lights and the headlights are put in an illuminated state. Thus, the above description is the operation of the automatic light backup circuit 100 when the CPU operates normally.

Next, the operation of the automatic light backup circuit 100 in a state that the CPU is abnormal will be described. When the CPU is abnormal, no pulse signal is outputted from the CPU, and no pulse signal is inputted from the terminal W100, whereby the capacitor C101 is discharged and the potential of the capacitor C1 constitutes a potential which is lower than the certain threshold. By this, the voltage level at the input terminal of the NOR gate N101 becomes low (L), and the voltage level at the output terminal thereof becomes high (H). Namely, the level of output from the CPU abnormality detection circuit is high. A low-level voltage is outputted from the 5V power supply risen delay circuit 102 after the period of time which is determined by the time constant of the circuit has elapsed since the power supply is risen. By this, a low-level voltage is outputted from the NOR gate 102 after the predetermined period of time has elapsed since the power supply is risen. In addition, when the ignition switch IG1 or IG2 is switched on by the ignition switch signal circuit 103, the transistor T1 is switched on, and an output from the NOR gate N102 is inputted into the NOR gate N103. As this occurs, when the level of output from the automatic light determination signal circuit 104 is low, the level of output from the NOR gate N103 becomes low, while the level of output from the NR gate N104 becomes high, whereby the transistor T103 is switched on, and the small lights relay and the headlights relay are activated to operate, the small lights and the headlights being thereby illuminated. On the other hand, when the level of output from the automatic light determination signal circuit 104 is high, the level of output from the NOR gate N103 becomes low, while the level of output from the NOR gate N104 becomes high, whereby the transistor T103 is put in the ON state, and the small lights relay and the headlights relay are activated to operate, the small lights and the headlights being thereby put in the illuminated state. Namely, when the CPU becomes abnormal, the small lights and the headlights are put in the illuminated state irrespective of the output from the automatic light determination signal circuit 104. Thus, the above description is the operation of the automatic light backup circuit 100 when the CPU becomes the abnormal state.

As has been described heretofore, the automatic light backup circuit 100 is the circuit configuration in which the four NOR gates N101, N102, N103 and N104 are used.

[Patent Document 1] JP-A-61-150040

In a vehicle load backup circuit like the automatic light backup circuit disclosed in Patent Document 1, since the configuration of the vehicle load backup circuit has logic ICs, those are the four NOR gates N101, N102, N103 and N104, it caused a problem that the control circuit is complex in circuit configuration and hence has to have a large number of parts involved.

SUMMARY

The invention has been made in view of the problem and an object thereof is to provide a vehicle load backup circuit which has a reduced number of parts involved and which is made small in size and low in cost.

In order to achieve the above object, according to the present invention, there is provided a vehicle load backup device, comprising:

an abnormality detection part which detects an abnormal operation of a processing part; and a backup driving part which drives a load based on an output from the abnormality detection part when the abnormality detection part detects the abnormal operation of the processing part.

Preferably, the vehicle load backup device, further comprising:

a reference voltage output part which outputs a reference voltage; and a comparison part which compares an output voltage from the abnormality detection part with the reference voltage from the reference voltage output part, and outputs a predetermined signal when the output voltage from the abnormality detection part is larger than the reference voltage from the reference voltage output part, wherein the abnormality detection part outputs a voltage smaller than the reference voltage when the processing part operates normally, and outputs a voltage larger than the reference voltage when the processing part operates abnormally; and wherein the backup driving part drives the load when the predetermined signal outputted from the comparison part is inputted into the backup driving part.

Preferably, the vehicle load backup device, further comprising:

a reference voltage output part which outputs a reference voltage; and a comparison part which compares an output voltage from the abnormality detection part with the reference voltage from the reference voltage output part, and outputs a predetermined signal when the output voltage from the abnormality detection part is smaller than the reference voltage from the reference voltage output part, wherein the abnormality detection part outputs a voltage larger than the reference voltage when the processing part operates normally, and outputs a voltage smaller than the reference voltage when the processing part operates abnormally; and wherein the backup driving part drives the load when the predetermined signal outputted from the comparison part is inputted into the backup driving part.

Preferably, the abnormality detection part outputs the voltage smaller than the reference voltage when pulses outputted from the processing part are inputted into the abnormality detection part at a constant pulse repetition frequency in a normal operation of the processing part, and outputs the voltage larger than the reference voltage when the pulses are not outputted from the processing part due to an abnormal operation of the processing part.

Preferably, the comparison part is a comparator ic which outputs the predetermined signal for driving the load.

Preferably, the vehicle load backup device, further comprising:

a vehicle load driving part which drives the load when the processing part operates normally; and a backup driving part which backup drives the vehicle load driving part when the vehicle load driving part becomes abnormal.

Preferably, the load is a headlamp.

Here, it is preferable that, a vehicle load backup method comprising:

a determination step of determining whether or not a processing part operates normally;

an abnormality detection step of outputting a voltage larger than a predetermined value when it is determined at the determination step that the processing part operates abnormally;

a comparison step of comparing the voltage outputted at the abnormality detection step with a reference voltage; and a backup drive step of driving a vehicle load when the voltage outputted at the abnormality detection step becomes larger than the reference voltage.

Preferably, when it is determined at the determination step that the processing part operates normally, the load is driven by a drive signal or a backup drive signal.

Preferably, the determination step determines whether or not the processing part operates normally based on whether or not a pulse of a constant cycle is outputted from the processing part.

ADVANTAGE OF THE INVENTION

According to the aspects of the invention, since the vehicle load backup circuit has the circuit configuration in which the comparator IC is used in place of the related circuit configuration in which the logic ICs are used for the NOR gates or the like, the simplified circuit can be realized. Furthermore, since the number of parts involved can be reduced, the space can be saved so as to realize the automatic light backup circuit which is small in size and low in cost.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, preferred embodiments for carrying out the invention will be described based on the accompanying drawings.

In embodiments of the invention, headlights are used as an example of a vehicle load, and a drive circuit for illuminating the headlights will be described.

Figure 1:
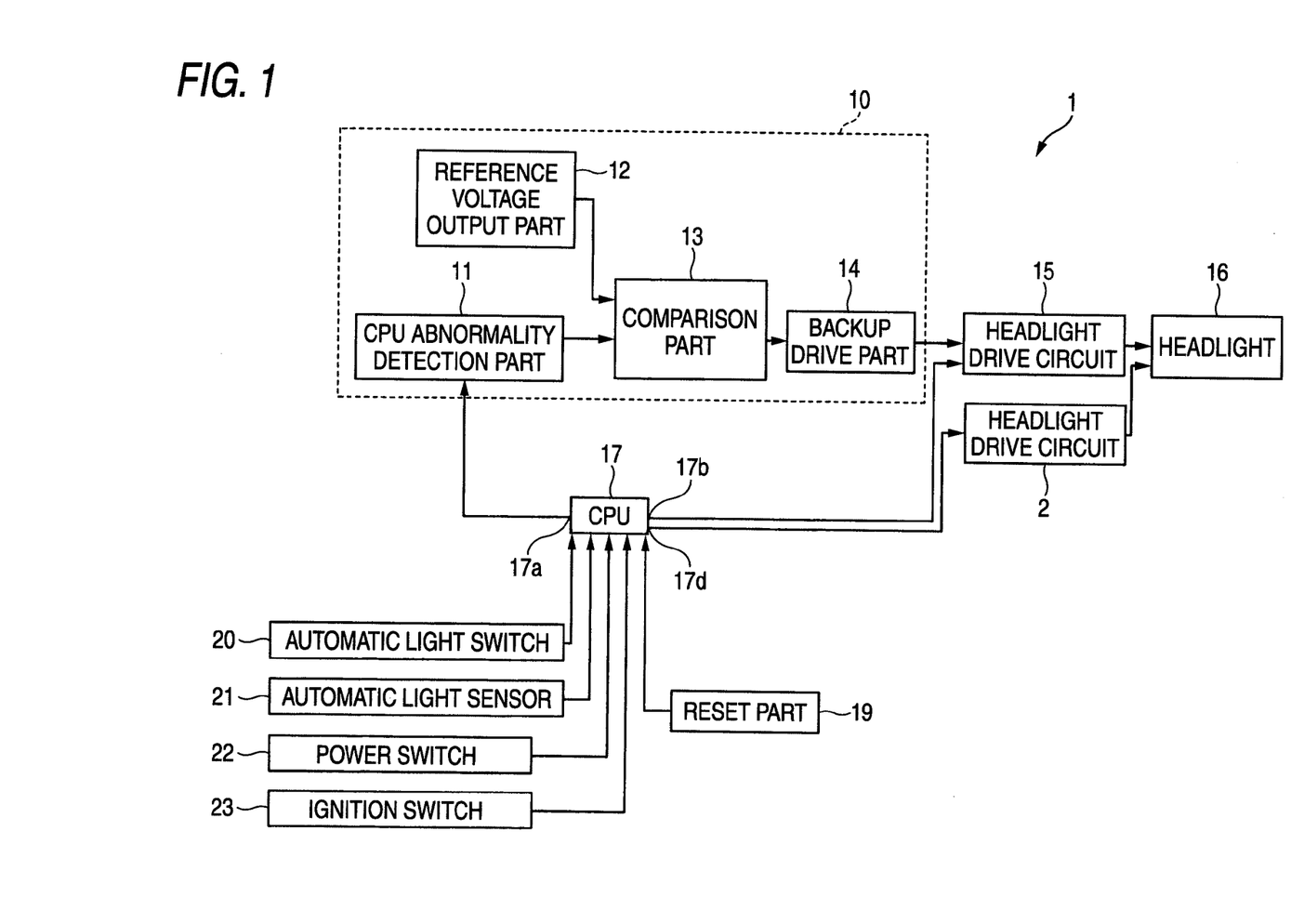
FIG. 1 is a functional block diagram of a drive circuit for illuminating headlights which includes an automatic light backup circuit according to a first embodiment of the invention.

FIG. 1 is a functional block diagram of an automatic light backup circuit for illuminating headlights which includes an automatic headlight backup circuit according to a first embodiment of the invention. A drive circuit 1 includes a headlight drive circuit 2 for illuminating headlights 16 and a headlight drive circuit 15 functioning as a backup when in the normal conditions. When an automatic headlights control, which will be, hereinafter, referred to simply as an automatic light control, is performed normally, a signal for driving the headlight drive circuit 2 is outputted from an output terminal 17d of a CPU 17. In addition, the drive circuit 1 includes an output terminal 17b of the CPU 17 for outputting to the headlight drive circuit 15 a first backup drive signal for backup driving the illumination of the headlights 16 when the CPU 17 operates normally. Furthermore, the drive circuit 1 includes an automatic light backup circuit 10 for outputting to the headlight drive circuit 15 a second backup drive signal for backup driving the headlights 16 when the CPU 17 is abnormal.

The automatic light backup circuit 10 includes a CPU abnormality detection part 11, a reference voltage output part 12, a comparison part 13 and a backup drive part 14. An output from the backup drive part 14 is inputted into the headlight drive circuit 15, and the headlight drive circuit 16 drives the headlights 16. In addition, an output from the output terminal 17b of the CPU 17 is inputted into the headlight drive circuit 15. Furthermore, a pulse output from an output terminal 17a of the CPU 17 is inputted into the CPU abnormality detection part 11. In addition, connected to the CPU 17 are a reset part 19, an automatic light switch 20, an automatic light sensor 21, a power switch 22 and an ignition switch 23.

The CPU abnormality detection part 11 is connected to the output terminal 17a which outputs pulses at a constant pulse repetition frequency when the CPU 17 operates normally and stops outputting the pulses when the CPU 17 operates abnormally, and this CPU abnormality detection part 11 outputs a voltage which is smaller than a predetermined value when the pulses are inputted thereinto at the constant cycle and outputs a voltage which is larger than the predetermined value when no pulse is inputted thereinto within a predetermined period of time. The CPU abnormality detection part 11 preferably has a capacitor C1 (refer to FIG. 2) whose charging voltage gets smaller than a constant value when the pulses are inputted thereinto at the constant pulse repetition frequency in a state that the CPU 17 operates normally but increases to be equal to or larger than the constant value when the pulses are inputted thereinto no more due to the abnormal state of the CPU 17.

The reference voltage output part 12 outputs a voltage of a predetermined value. The comparison part 13 compares the output voltage of the CPU abnormality detection part 11 with the output voltage of the reference voltage output part 12 and outputs a predetermined signal when the output voltage of the CPU abnormality detection part 11 becomes equal to or larger than the output voltage value of the reference voltage output part 12. The comparison part 13 is preferably a comparator IC 1 (refer to FIG. 2) which outputs an ON signal when the output voltage of the CPU abnormality detection part 11 is equal to or larger than the output voltage of the reference voltage output part 12 (the output voltage is at a high level) and outputs an OFF signal when the output voltage of the CPU abnormality detection part 11 is smaller than the output voltage of the reference voltage output part 12 (the output voltage is at a low level). The backup drive part 14 activates the headlight drive circuit 15 when a predetermined ON signal is inputted thereinto from the comparison part 13, so as to output a voltage to the headlight drive circuit 15 which illuminates the headlights 16.

In the automatic light backup circuit 10, when the CPU 17 operates normally, pulses are outputted at the constant pulse repetition frequency from the output terminal 17a of the CPU 17, and the pulses are inputted into the CPU abnormality detection part 11. As this occurs, the CPU abnormality detection part 11 outputs a lower voltage than the voltage of the predetermined value which is outputted from the reference output voltage part 12. Because of this, the comparison part 13 control the backup drive part 14 so as not to output the predetermined signal for illuminating the headlights 16 from the backup drive part 14, whereby the backup drive part 14 is left in an inoperable state. On the other hand, when the CPU 17 gets abnormal, no pulse is inputted into the CPU abnormality detection part 11 from the output terminal 17a of the CPU 17 within the predetermined period of time, and as this occurs, the CPU abnormality detection part 11 outputs a higher voltage than the voltage of the predetermined value which is outputted from the reference voltage output part 12. Because of this, the comparison part 13 controls the backup drive part 14 so as to output the predetermined signal for illuminating the headlights 16, whereby the backup drive part 14 is put in an operating state in which the backup drive part 14 outputs a drive signal and then outputs a voltage to the headlight drive circuit 15 for illuminating the headlights 16, whereby the headlights 16 are held in the illuminated state.

In addition, the reset part (reset IC) 19 continues to output a reset signal to the CPU 17 so that a microcomputer including the CPU 17 is kept inoperable within a constant period of time since power was started to be supplied by the power switch 22. A circuit constant for resistors R1, R2, R3 and the capacitor C1 of the automatic light backup circuit 10 is configured to be set in advance so that the automatic light backup circuit 10 is not activated within a constant period of time until the reset of the CPU 17 is released.

The CPU 17 determines whether or not an automatic light mode is in operation on the basis of an on/off signal from the automatic light switch 20 and a signal from the automatic light sensor 21 which detects that the ambient brightness gets darker than a predetermined brightness, and in the event that a ON condition for the automatic light mode has not yet been established, signals for activating the headlight drive circuit 15 and the headlight drive circuit 2 are not outputted from the output terminals 17b and 17d, respectively. In addition, when the CPU 17 determines that the ON condition for the automatic light mode has been established, signals for activating the headlight drive circuit 15 and the headlight drive circuit 2 are outputted from the output terminals 17b and 17d, respectively.

Figure 2:
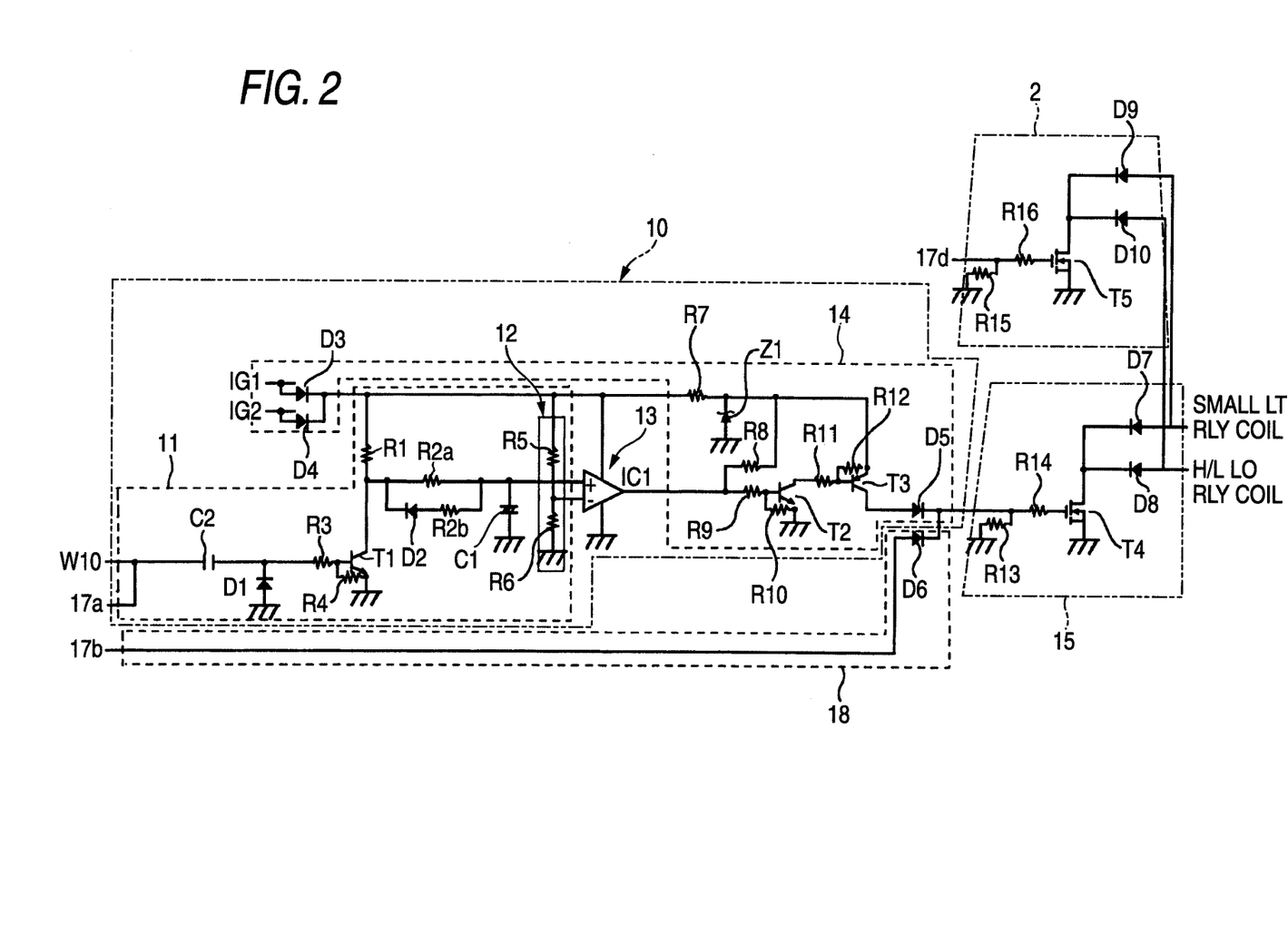
FIG. 2 is a circuit diagram of the automatic light backup circuit according to the first embodiment of the invention.

FIG. 2 is a circuit diagram of the automatic light backup circuit 10 according to the embodiment of the invention. In the automatic light backup circuit 10, the output terminal 17a of the CPU 17 is connected to an input terminal W10 of a regulator, and an output from the CPU abnormality detection part 11 which includes resistors R1 to R4, capacitors C1, C2, diodes D1, D2 and a transistor T1 and an output from the reference voltage output part 12 in which ignition switches IG1, IG2 are connected to resistors R5, R6 via diodes D3, D4, respectively, are inputted into the comparator IC1 which constitutes the comparison part 13. An output from the comparator IC1 is inputted into a base of a transistor T2 of the backup drive part 14 which includes resistors R7 to R12, a diode D5, a Zener diode Z1, the transistor T2 and a transistor T3, and an output from a collector of the transistor T3 is outputted via the diode D5. Furthermore, an output from the output terminal 17b of the CPU 17 is outputted from an automatic light determination signal circuit 18 via a diode D6. Cathode sides of the diodes D5, D6 are commonly connected and outputs from the backup drive part 14 and the automatic light determination signal circuit 18 are inputted into a gate of a transistor T4 of the circuit (headlight drive circuit) 15 which illuminates the headlights 16 via resistors R13, R14, respectively. By switching the transistor T4 on and off, relays for driving the small lights and the headlights are switched on and off via diodes D7, D8, respectively. In addition, FIG. 2 also shows the headlight drive circuit 2 which includes resistors R15, R16, diodes D9, D10 and a transistor T5.

In the above described configuration, as with the related art in FIG. 9, a CPU abnormality is detected using as a trigger the stoppage of pulse signals that are outputted from the output terminal 17a of the CPU 17. However, by changing the configuration of the backup circuit 10 from the circuit configuration shown in FIG. 9 in which the logic ICs such as the NOR gates N101 to N104 are used to the configuration in which the comparator IC1 which constitutes the comparison part 13, the simplification of the circuit is enabled. In addition, since the number of parts involved can be reduced, space can be saved, which realizes a reduction in size and cost.

Hereinafter, the function of the automatic light backup circuit 10 that has been configured as described above will be described. This automatic light backup circuit 10 is a circuit system for detecting abnormality in the CPU based on an output state of a pulse signal outputted from the output terminal 17a of the CPU 17.

A behavior of the automatic light backup circuit will be described when pulse signals are outputted normally from the output terminal 17a of the CPU 17. The capacitor C1 is charged and discharged by switching the transistor T1 on and off in synchronism with pulse signals outputted from the output terminal 17a of the CPU 17. When the transistor T1 is off, the capacitor C1 is charged from the power supply for the ignition switch IG1 or IG2 via a charging path which extends up to the capacitor C1 by way of the diodes D3, D4 and the resistors R1, R2a. When the transistor T1 is on, the electric charge which is stored in the capacitor C1 is discharged therefrom via a discharging path which extends down to the transistor T1 by way of the resistors R2b and the diode D2. When pulse signals are outputted normally, since charging to and discharging from the capacitor C1 are repeated within a region where a potential of the capacitor C1 (an input voltage of the comparator IC1) does not exceed a reference voltage (a threshold voltage which determines on or off of output) of the comparator IC1, the output of the comparator IC1 is in the off state (the output voltage is at a low voltage level) and the backup drive circuit is made inoperable.

Next, a behavior of the automatic light backup circuit will be described when the output of pulse signals is stopped. In the event that pulse signals from the CPU 17 which are outputted from the output terminal 17a remain at HIGH or LOW (the output of pulse signals is stopped), since the transistor T1 remains switched off, the electric charge stored in the capacitor C1 is not discharged, and hence, the capacitor C1 continues to be charged further. The output of the comparator IC1 is switched on at a point in time when the potential of the capacitor C1 (the input voltage of the comparator IC1) exceeds the reference voltage (the threshold voltage which determines on or off of output) of the comparator IC1 after a period of time set from the stop of output of pulse signals to the activation of the automatic light backup circuit 10 (the output voltage is at a high voltage level), whereby the backup drive circuit is activated for operation.

Figure 3:
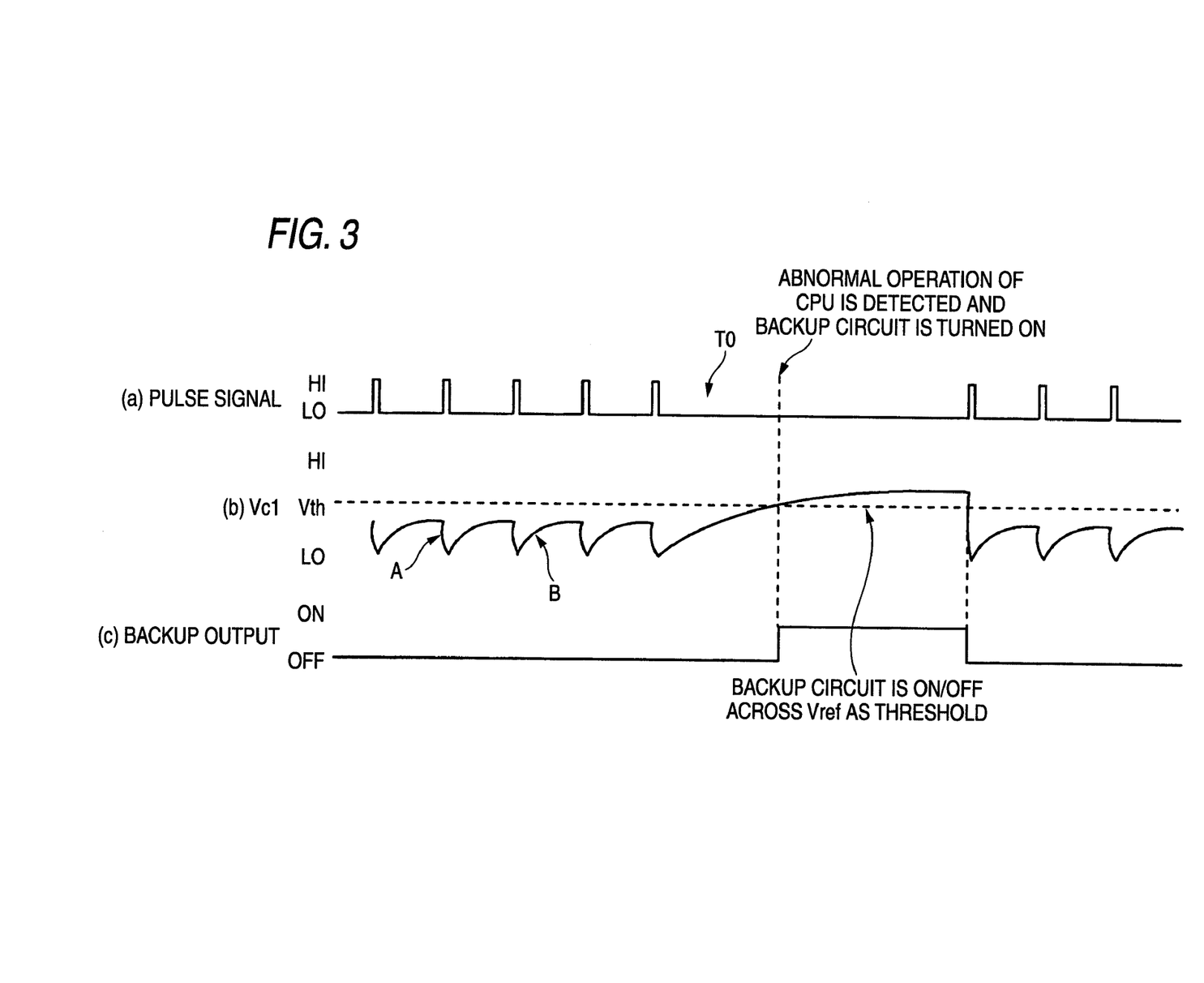
FIG. 3 is a diagram showing an ON/OFF operation of the backup circuit by detecting abnormality in a CPU in the automatic light backup circuit according to the first embodiment of the invention.

FIG. 3 is a diagram showing an on/off operation of the automatic light backup circuit 10 as a result of detection of abnormality in the CPU. In FIG. 3, (a) shows a pulse signal which is outputted from the output terminal 17a of the CPU 17, (b) shows a change in the potential VC1 of the capacitor C1 with time, and Vth denotes the reference voltage, and (c) shows an output from the backup drive part 14. As is shown in FIG. 3, when the CPU 17 operates normally, pulse signals are outputted from the output terminal 17a at a constant pulse repetition frequency. As this occurs, the electric charge stored in the capacitor C1 is discharged through the path extending by way of the resistor R2b and the diode D2 (see point A, for example). On the other hand, the capacitor C1 is charged through the path extending by way of the resistors R1, R2a (see point B, for example), whereby the potential VC1 of the capacitor C1 is made to have a lower value than the reference voltage Vth. As this occurs, the output of the backup drive part 14 is off. When the CPU 17 becomes abnormal at time T0 and hence no pulse is generated, the electric charge of the capacitor C1 is not discharged while the capacitor C1 continues to be charged further, and when the potential VC1 of the capacitor C1 exceeds the reference voltage Vth, abnormality in the CPU is detected, whereby the output of the backup drive part 14 is put in the on state (the headlights are put in the illuminated state).

Figure 4:
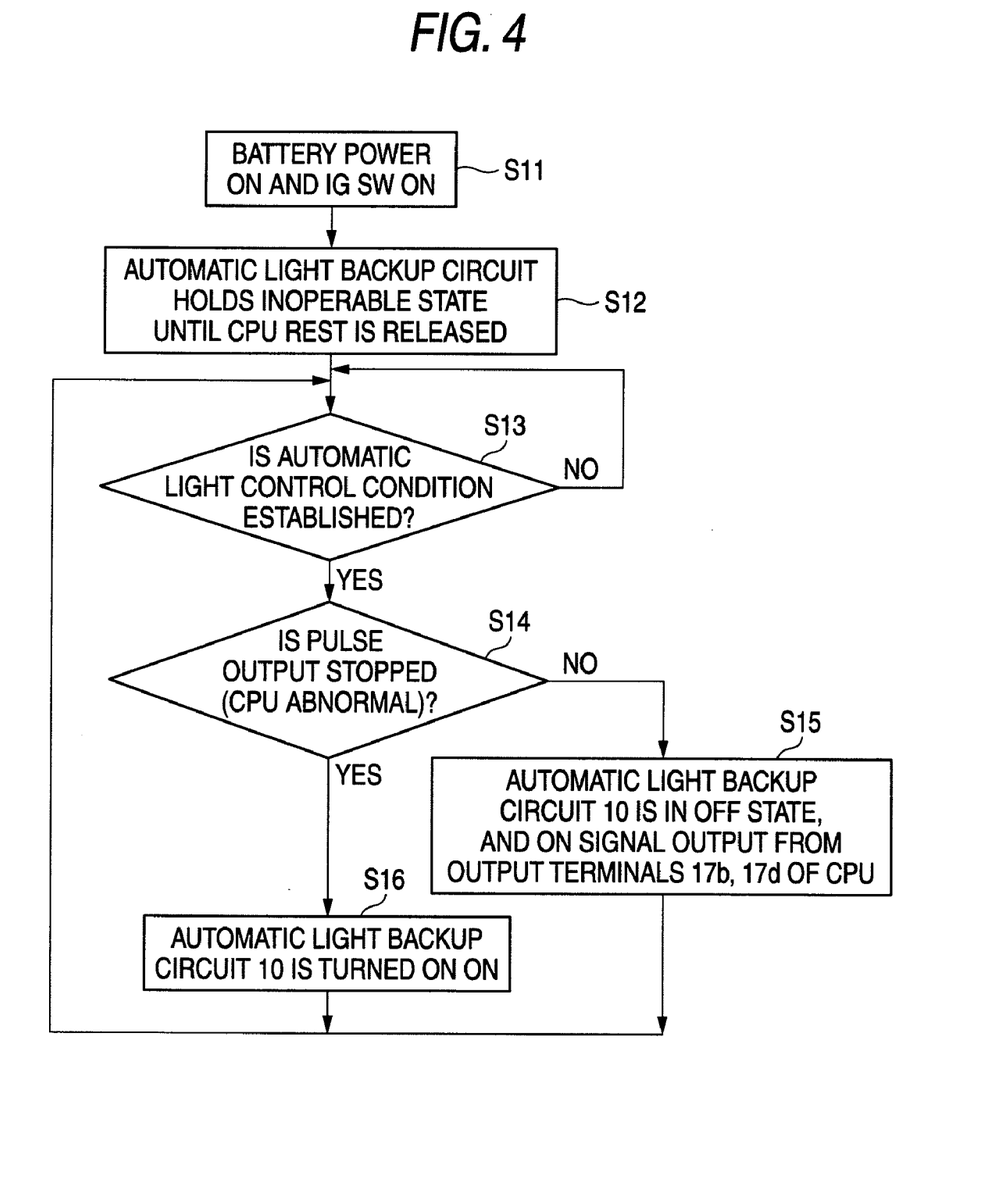
FIG. 4 is a flowchart illustrating the operation of the automatic light backup circuit according to the first embodiment of the invention.

FIG. 4 is a flowchart which illustrates the operation of the automatic light backup circuit 10 according to the embodiment of the invention.

Step S11: A battery power supply, not shown, is switched on and the ignition switches IG1, IG2 are switched on.

Step S12: A reset signal is outputted from the reset part 19 to the CPU 17, and the automatic light backup circuit 10 is held in the inoperable state until the reset of the CPU 17 is released.

Step S13: Whether or not the automatic light control ON condition has been established is determined. Namely, whether or not the automatic light mode is in operation is determined based on signals from the IGSW (IG2, IG2), the automatic light switch 20 and the automatic light sensor 21.

If it is determined at step S13 that the automatic light control ON condition has not yet been established, the CPU 17 does not output signals for driving the headlight drive circuit 15 and the headlight drive circuit 2 from the output terminal 17b and the output terminal 17d, respectively, and executes step S13 again.

Step S14: If it is determined at step S13 that the automatic light control ON condition has been established, it is determined whether or not the output of pulse signals from the output terminal 17a of the CPU 17 has been stopped.

Step S15: If it is determined at step S14 that the output of pulse signals from the output terminal 17a of the CPU 17 has not yet been stopped, the automatic light backup circuit 10 is in the off state, and ON signals are outputted from the output terminal 17b and the output terminal 17d.

Step S16: If it is determined at step S14 that the output of pulse signals from the output terminal 17a of the CPU 17 has been stopped, the automatic light backup circuit 10 becomes on. Then, the operation flow returns to step S13 to continue the operations.

The operation of the automatic light backup circuit 10 at step S16 is as follows.

In the case of the CPU 17 being abnormal state, the CPU abnormality detection part 11 outputs the voltage equal to or larger than the predetermined value when the CPU is abnormal. The reference voltage output part 12 outputs the voltage of the predetermined value. The comparison part 13 compares the output voltage of the CPU abnormality detection part 11 with the output voltage of the reference voltage output part 12 and outputs the predetermined signal when the output voltage of the CPU abnormality detection part 11 becomes larger than the output voltage of the reference voltage output part 12. The predetermined signal outputted from the comparison part 13 is inputted into the backup drive part 14, whereby the automatic light backup circuit 10 becomes on.

According to the embodiment that has been described heretofore, since the automatic light backup circuit 10 results whose circuit configuration is changed from the related circuit configuration in which the logic ICs are used to the circuit configuration in which the comparator IC1 is used, the simplified circuit can be realized. In addition, since the number of parts involved in the automatic light backup circuit can be reduced, space can be saved, whereby the automatic light backup circuit can be made smaller in size and lower in cost.

Figure 5:
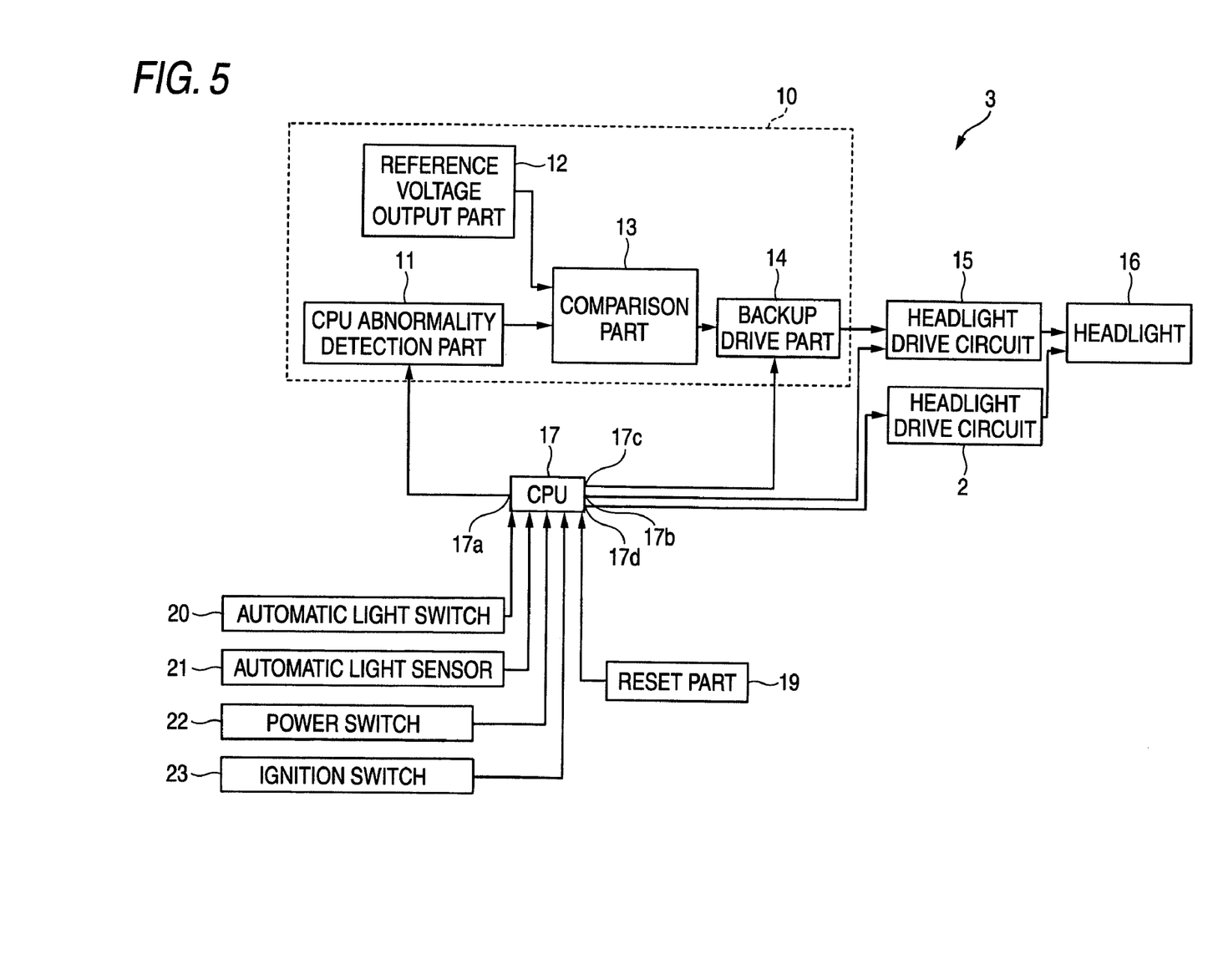
FIG. 5 is a functional block diagram of a drive circuit for illuminating headlights which includes an automatic light backup circuit according to a second embodiment of the invention.

FIG. 5 is a functional block diagram of a drive circuit 3 for illuminating headlights which includes an automatic light backup circuit according to a second embodiment of the invention. The second embodiment is different from the first embodiment in that a CPU 17 is provided with a terminal 17c which outputs a signal for controlling the operation of a backup drive part 14 but is the same as the first embodiment in the other features. Therefore, the second embodiment will be described by imparting like reference numerals to like constituent elements to those described in the first embodiment.

In the second embodiment, a backup drive part 14 is controlled by an output terminal 17c so that an automatic light backup circuit 10 is not activated to operate when the reset of a CPU 17 is not released by a reset part 19. Furthermore, the backup drive part 14 is controlled by the output terminal 17c so that the automatic light backup circuit 10 is not activated to operate within a transition time taken from a power switch 22 is switched on until the modes of the CPU 17 are switched from an inoperable mode to an operable mode, whereby being from the first embodiment, a circuit constant for resistors R1, R2, a capacitor C1 and the like within the circuit can be set independently from a time constant of the reset part 19.

The CPU 17 determines from an on/off signal from an automatic light switch 20 and a signal from an automatic light sensor 21 which detects that the ambient brightness gets darker than a predetermined brightness whether or not an automatic light mode is in operation, and in the event that a condition for the automatic light mode has not yet been established, the CPU 17 controls by way of the output terminal 17c so that the backup drive part 14 is not activated to operate. In addition, when the CPU 17 determines that the condition for the automatic light mode has been established, the CPU 17 controls by way of the output terminal 17c so that the backup part 14 is activated to operate.

Figure 6:
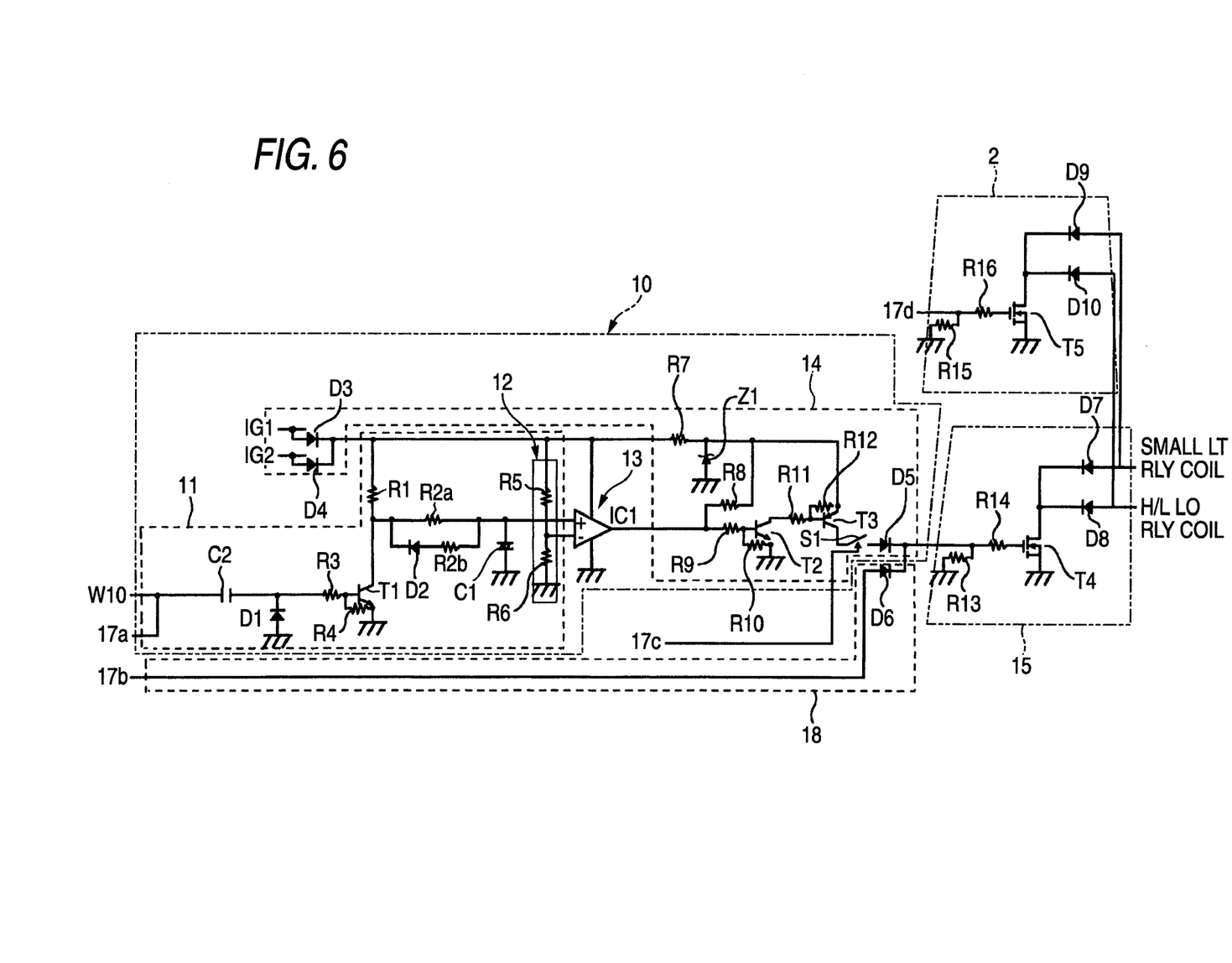
FIG. 6 is a circuit diagram of the automatic light backup circuit according to the second embodiment of the invention.

FIG. 6 is a circuit diagram of the automatic light backup circuit 10 according to the second embodiment of the invention, and in order to realize the operation described above as the specific feature to this embodiment, an on/off switch S1 is provided prior to a diode D5 in the circuit shown in FIG. 2, and this on/off switch is made to be switched on and off by signals from the output terminal 17c of the CPU 17. The circuit diagram shown in FIG. 6 is the same as the one shown in FIG. 2 in the other details. Therefore, like reference numerals will be imparted to like constituent elements to those shown in FIG. 2 and the description thereof will be omitted here. The switch S1 can be made up by making use of a transistor or an analog switch.

Figure 7:
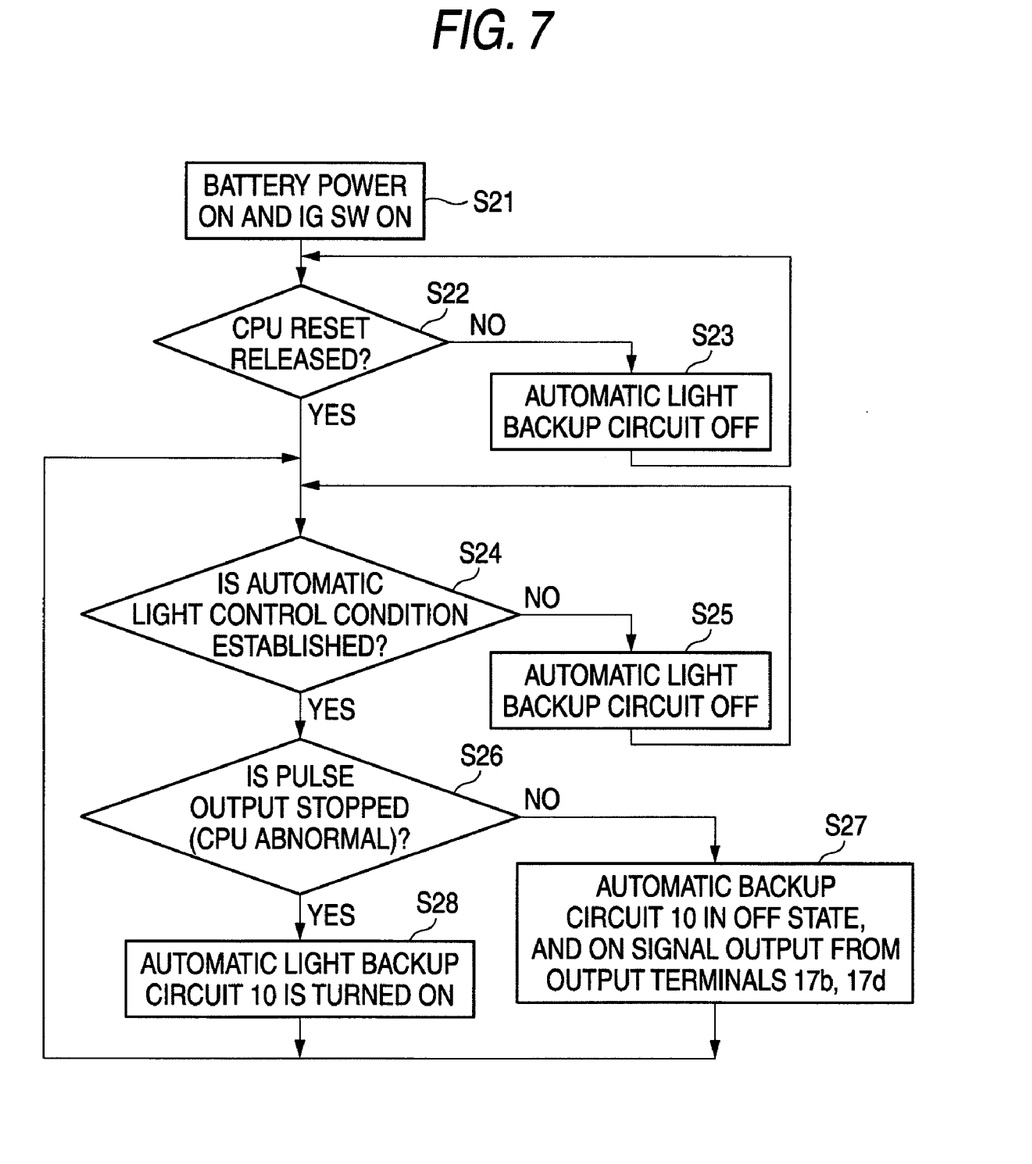
FIG. 7 is a flowchart illustrating the operation of the automatic light backup circuit according to the second embodiment of the invention.

FIG. 7 is a flowchart which illustrates the operation of the automatic light backup circuit 10 according to the second embodiment of the invention.

Step S21: A battery power supply, not shown, is switched on and ignition switches IG1, IG2 are switched on.

Step S22: The reset part 19 determines whether or not the reset of the CPU 17 has been released.

Step S23: If it is determined at step S22 that the reset of the CPU 17 has not yet been released, the CPU 17 outputs a signal from the output terminal 17c which renders the backup drive part 14 inoperable and switches the automatic light backup circuit 10 off.

Step S24: If it is determined at step S22 that the reset of the CPU 17 has been released, it is determined whether or not a condition for automatic light control has been established. Namely, it is determined based on signals from IGSW (IG1, IG2), the automatic light switch 20 and the automatic light sensor 21 whether or not an automatic light mode is in operation.

Step S25: If it is determined at step S24 that the condition for automatic light control has not yet been established, the CPU 17 outputs a signal from the output terminal 17c which renders the backup drive part 14 inoperable and switches the automatic light backup circuit 10 off. In addition, the CPU 17 does not output signals for driving a headlight drive circuit 15 and a headlight drive circuit 2 from the output terminal 17*b* and the output terminal 17*d* thereof.

Step S26: If it is determined at step S24 that the condition for automatic light control has been established, the CPU 17 controls so as to activate the backup drive part 14 for operation, and it is determined whether or not the output of pulse signals from the output terminal 17*a* of the CPU 17 is stopped.

Step S27: If it is determined at step S26 that the output of pulse signals from the output terminal 17*a* of the CPU 17 is not stopped, the automatic light backup circuit 10 is in an off state, and the CPU 17 outputs ON signals from the output terminals 17*b*, 17*d* thereof.

Step S28: If it is determined at step S26 that the output of pulse signals from the output terminal 17*a* of the CPU 17 is stopped, the automatic light backup circuit 10 becomes on. Then, the operation at step S24 is executed.

The operation of the automatic light backup circuit 10 at step S28 is as follows.

In the case of the CPU 17 being abnormal state, a CPU abnormality detection part 11 outputs a voltage equal to or larger than a predetermined value when the CPU is abnormal. A reference voltage output part 12 outputs a voltage of a predetermined value. A comparison part 13 compares the output voltage of the CPU abnormality detection part 11 with the output voltage of the reference voltage output part 12 and outputs a predetermined signal when the output voltage of the CPU abnormality detection part 11 becomes larger than the output voltage of the reference voltage output part 12. The predetermined signal that is outputted from the comparison part 13 is inputted into the backup drive part 14, whereby the automatic light backup circuit 10 becomes on.

According to the embodiment as described above, since the automatic light backup circuit 10 results whose circuit configuration is changed from the related circuit configuration in which the logic ICs are used to the circuit configuration in which the comparator IC1 is used, the simplified circuit can be realized. In addition, since the number of parts involved in the automatic light backup circuit can be reduced, space can be saved, whereby the automatic light backup circuit can be made smaller in size and lower in cost.

In the embodiments as described above, while the vehicle load backup circuit is described as including the CPU abnormality detection part for outputting the voltage smaller than the predetermined value when the CPU operates normally and outputting the voltage larger than the predetermined value when the CPU is abnormal, the reference voltage output part for outputting the voltage of the predetermined value, the comparison part for comparing the output voltage of the CPU abnormality detection part with the output voltage of the reference voltage output part to output the predetermined signal when the output voltage of the CPU abnormality detection part becomes larger than the output voltage of the reference voltage output part, and the backup drive part for driving the vehicle load when the predetermined signal outputted from the comparison part is inputted thereinto, the invention is not limited to the configuration described above, and hence, when the relationship of the output voltages with respect to their magnitude is reversed, the invention may adopt a vehicle load backup circuit including a CPU abnormality detection part for outputting a voltage larger than a predetermined value when a CPU operates normally and outputting a voltage smaller than the predetermined value when the CPU is abnormal, a reference voltage output part for outputting a voltage of a predetermined value, a comparison part for comparing the output voltage of the CPU abnormality detection part with the output voltage of the reference voltage output part to output a predetermined signal when the output voltage of the CPU abnormality detection part becomes smaller than the output voltage of the reference voltage output part, and a backup drive part for driving a vehicle load when the predetermined signal outputted from the comparison part is inputted thereinto.

In addition, in the embodiments, while the automatic light backup circuit for headlights has been described as the vehicle load backup circuit, the invention is not limited thereto, and hence, the invention can be similarly applied to other lighting systems and motors.

Figure 8:
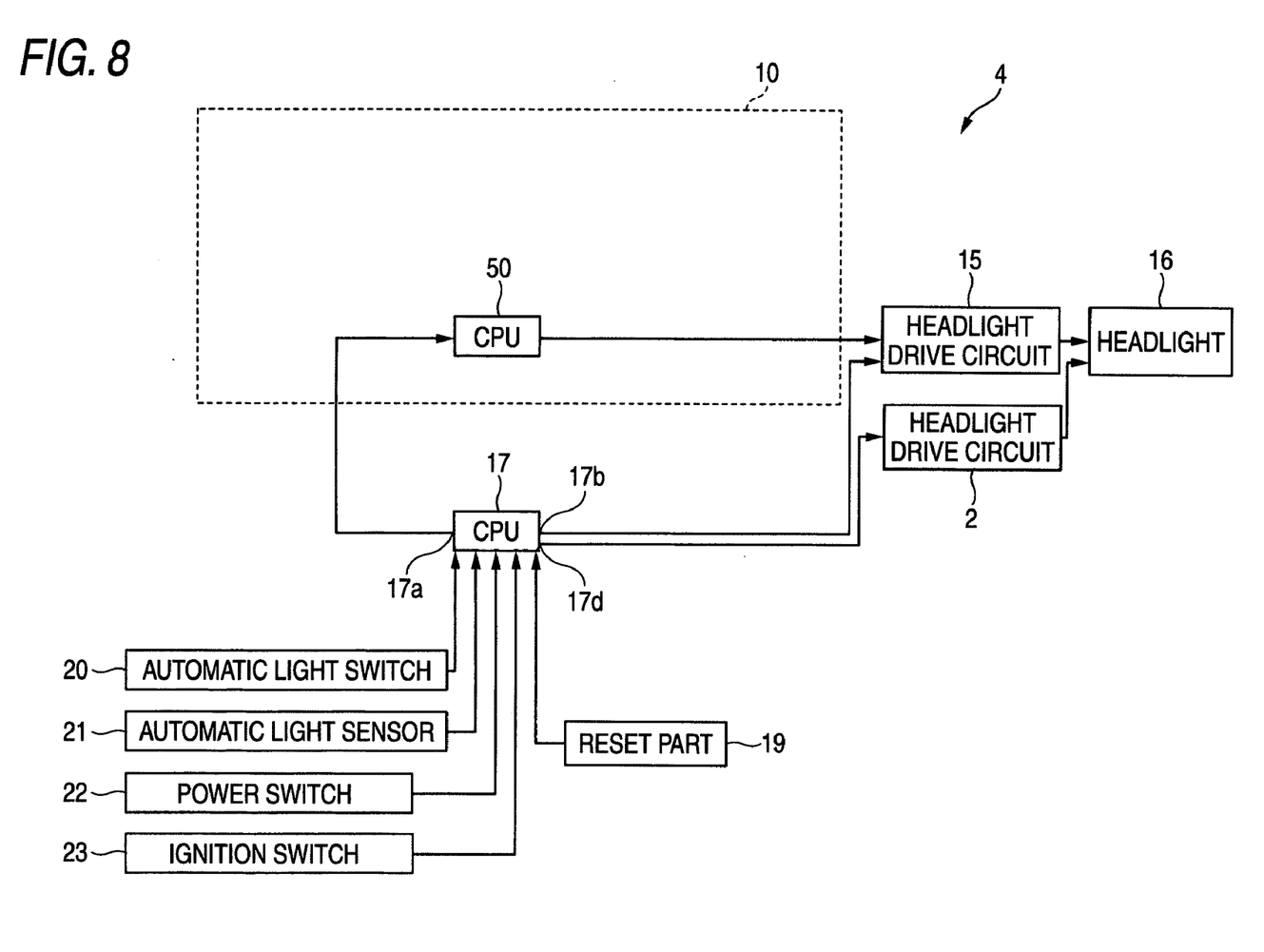
FIG. 8 is a functional block diagram of a drive circuit for illuminating headlights which includes an automatic light backup circuit according to a further embodiment of the invention.

Additionally, in the embodiments, while the automatic light backup circuit 10 is configured so as to have a combination of circuit elements such as capacitors, resistors and comparator IC, the automatic light backup circuit can be configured so as to have another CPU which is separate from the CPU 17. FIG. 8 is a functional block diagram of a drive circuit 4 which shows an example in which a CPU 50 being separate from the CPU 17 is used. For example, the CPU 50 reads that no pulse is outputted from the output terminal 17*a* of the CPU 17 when the CPU 17 gets abnormal and outputs an ON signal to the headlight drive circuit 15 so as to illuminate the headlights 16. By this configuration, the headlights 16 can be illuminated even when the CPU 17 becomes abnormal. Alternatively, as a method of detecting abnormality in the CPU 17, in the event that it is configured that a predetermined code is periodically written into a RAM within the CPU 50 from the CPU 17 and the CPU 50 is made to read the predetermined code so written, since the predetermined code cannot be written when the CPU 17 becomes abnormal, the CPU 50 is allowed to detect an abnormal operation of the CPU 17.

The configurations and positional relationships of the constituent elements that have been described in the embodiments are the examples which are merely described to such an extent that the invention can be understood and embodied. Consequently, the invention is not limited to the embodiments that have been described herein but can be modified variously without departing from the spirit and scope of the invention from the technical point of view.

The invention can be applied as a vehicle load backup circuit and a vehicle load backup method.

The present application is based on Japan Patent Application No. 2007-254003 filed on Sep. 28, 2007, the contents of which are incorporated herein for reference.

What is claimed is:

1. A vehicle load backup device, comprising:
    an abnormality detection part which detects an abnormal operation of a processing part related to driving a load; and
    a backup driving part which drives the load based on an output from the abnormality detection part when the abnormality detection part detects the abnormal operation of the processing part;
    a reference voltage output part which outputs a reference voltage; and
    a comparison part which compares an output voltage from the abnormality detection part with the reference voltage from the reference voltage output part, and outputs a predetermined signal when the output voltage from the abnormality detection part is larger than the reference voltage from the reference voltage output part,
    wherein the abnormality detection part outputs a voltage smaller than the reference voltage when the processing part operates normally, and outputs a voltage larger than the reference voltage when the processing part operates abnormally; and wherein the backup driving part drives the load when the predetermined signal outputted from the comparison part is inputted into the backup driving part.

2. The vehicle load backup device according to claim 1, wherein the abnormality detection part outputs the voltage smaller than the reference voltage when pulses outputted from the processing part are inputted into the abnormality detection part at a constant pulse repetition frequency in a normal operation of the processing part, and outputs the voltage larger than the reference voltage when the pulses are not outputted from the processing part due to an abnormal operation of the processing part.

3. The vehicle load backup device according to claim 1, wherein the comparison part is a comparator is which outputs the predetermined signal for driving the load.

4. The vehicle load backup device according to claim 1, further comprising:
a vehicle load driving part which drives the load when the processing part operates normally; and
a backup driving part which backup drives the vehicle load driving part when the vehicle load driving part becomes abnormal.

5. The vehicle load backup device according to claim 1, wherein the load is a headlamp.

6. A vehicle load backup device, comprising:
an abnormality detection part which detects an abnormal operation of a processing part related to driving a load; and
a backup driving part which drives the load based on an output from the abnormality detection part when the abnormality detection part detects the abnormal operation of the processing part;
a reference voltage output part which outputs a reference voltage; and
a comparison part which compares an output voltage from the abnormality detection part with the reference voltage from the reference voltage output part, and outputs a predetermined signal when the output voltage from the abnormality detection part is smaller than the reference voltage from the reference voltage output part,
wherein the abnormality detection part outputs a voltage larger than the reference voltage when the processing part operates normally, and outputs a voltage smaller than the reference voltage when the processing part operates abnormally; and
wherein the backup driving part drives the load when the predetermined signal outputted from the comparison part is inputted into the backup driving part.

7. The vehicle load backup device according to claim 6, further comprising:
a vehicle load driving part which drives the load when the processing part operates normally; and
a backup driving part which backup drives the vehicle load driving part when the vehicle load driving part becomes abnormal.

8. The vehicle load backup device according to claim 6, wherein the load is a headlamp.

9. A vehicle load backup method comprising:
a determination step of determining whether or not a processing part operates normally;
an abnormality detection step of outputting a voltage larger than a predetermined value when it is determined at the determination step that the processing part operates abnormally;
a comparison step of comparing the voltage outputted at the abnormality detection step with a reference voltage; and
a backup drive step of driving a vehicle load when the voltage outputted at the abnormality detection step becomes larger than the reference voltage.

10. The vehicle load backup method according to claim 9, wherein when it is determined at the determination step that the processing part operates normally, the load is driven by a drive signal or a backup drive signal.

11. The vehicle load backup method according to claim 9, wherein the determination step determines whether or not the processing part operates normally based on whether or not a pulse of a constant cycle is outputted from the processing part.

* * * * *